United States Patent
Bhattad et al.

(10) Patent No.: US 12,477,578 B2
(45) Date of Patent: Nov. 18, 2025

(54) CONFIGURED GRANT CHANNEL OCCUPANCY TIME SHARING PROCEDURE

(71) Applicant: QUALCOMM Incorporated, San Diego, CA (US)

(72) Inventors: Kapil Bhattad, Bangalore (IN); Xiaoxia Zhang, San Diego, CA (US); Pravjyot Singh Deogun, Bengaluru (IN); Jing Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 364 days.

(21) Appl. No.: 17/755,185

(22) PCT Filed: Nov. 5, 2020

(86) PCT No.: PCT/US2020/059220
§ 371 (c)(1),
(2) Date: Apr. 22, 2022

(87) PCT Pub. No.: WO2021/092256
PCT Pub. Date: May 14, 2021

(65) Prior Publication Data
US 2022/0377795 A1    Nov. 24, 2022

(30) Foreign Application Priority Data
Nov. 8, 2019 (IN) .............. 201941045481

(51) Int. Cl.
*H04W 74/0816* (2024.01)
*H04W 74/00* (2009.01)
*H04W 74/08* (2009.01)

(52) U.S. Cl.
CPC ..... *H04W 74/0816* (2013.01); *H04W 74/004* (2013.01); *H04W 74/0875* (2013.01)

(58) Field of Classification Search
CPC .............. H04W 74/004; H04W 74/006; H04W 74/0808; H04W 74/0816; H04W 74/0875
See application file for complete search history.

(56) References Cited

U.S. PATENT DOCUMENTS 10,772,113 B2   9/2020  Yerramalli et al.
2017/0318607 A1  11/2017  Tiirola et al.
(Continued)

FOREIGN PATENT DOCUMENTS

CN    110167143 A    8/2019
WO   WO-2018106911 A2   6/2018
(Continued)

OTHER PUBLICATIONS

Ericsson: "AUL Signaling and HARQ Operation", 3GPP TSG RAN WG1 Meeting #92, 3GPP Draft; R1-1802535 Remaining Issues on AUL HARQ Design, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 16, 2018 (Feb. 16, 2018), 8 Pages, XP051397325, Retrieved from the Internet: URL: http://www.3gpp.org/ftp/tsg%5Fran/WG1%5FRL1/TSGR1%5F92/Docs/ [retrieved on Feb. 16, 2018] Section 5—Appendix; pp. 7-8.
(Continued)

*Primary Examiner* — Pao Sinkantarakorn
(74) *Attorney, Agent, or Firm* — Norton Rose Fulbright US LLP

(57) ABSTRACT

Configured grant (CG) channel occupancy time (COT) sharing procedure is disclosed. A user equipment (UE) sharing a COT may indicate in the uplink control indicator (UCI) the remaining COT duration, an offset indication identifying where the uplink transmission is expected to end, and a channel access priority class (CAPC) which may be used by the base station to determine which type of data may be included in downlink transmissions in the shared COT.

(Continued)

Where the energy detection (ED) threshold has not been configured for COT sharing, the UE may reduce the information included in the UCI. The base station may alternatively configured which information for the UE to include in the UCI for potential COT sharing. The COT sharing information may further be compressed by coding such information into tables or leveraging knowledge of transmission characteristics, such as configured end points.

32 Claims, 8 Drawing Sheets

(56) References Cited

U.S. PATENT DOCUMENTS

| | | | |
|---|---|---|---|
| 2018/0352537 A1* | 12/2018 | Zhang | H04W 72/04 |
| 2019/0045544 A1 | 2/2019 | Wang et al. | |
| 2019/0342911 A1 | 11/2019 | Talarico et al. | |
| 2021/0105815 A1* | 4/2021 | Salem | H04W 16/14 |
| 2021/0368351 A1* | 11/2021 | Cui | H04W 74/0808 |
| 2022/0015144 A1* | 1/2022 | Li | H04W 74/0808 |
| 2022/0167407 A1* | 5/2022 | Oviedo | H04W 74/0808 |
| 2022/0256575 A1* | 8/2022 | Wang | H04L 1/1887 |
| 2022/0256595 A1* | 8/2022 | Wang | H04W 74/0866 |
| 2022/0256605 A1* | 8/2022 | Jiang | H04L 5/0091 |
| 2022/0304059 A1* | 9/2022 | Lei | H04W 74/08 |

FOREIGN PATENT DOCUMENTS

| | | |
|---|---|---|
| WO | WO-2018144976 | 8/2018 |
| WO | WO-2020146833 A1 | 7/2020 |
| WO | WO-2020168320 A1 | 8/2020 |
| WO | WO-2021092256 | 5/2021 |

OTHER PUBLICATIONS

Huawei, et al., "Transmission with Configured Grant in NR Unlicensed Band", 3GPP TSG RAN WG1 Meeting #98bis, 3GPP Draft; R1-1910048, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 8, 2019 (Oct. 8, 2019), 22 Pages, XP051809062, Retrieved from the Internet: URL: https://ftp.3gpp.org/tsg_ran/WG1_RL1/TSGR1_98b/Docs/ R1-1910048.zip R1-1910048.docx [retrieved on Oct. 8, 2019] p. 14, line 4-p. 18, figure 10, table 1.
International Search Report and Written Opinion—PCT/US2020/059220—ISA/EPO—Jan. 25, 2021.
Nokia, et al., "Feature Lead's Summary on Channel Access Procedures", 3GPP TSG RAN WG1 Meeting #98bis, 3GPP Draft; R1-1910592_NR-U Channel Access FL Summary V0_THU EOM, 3rd Generation Partnership Project (3GPP), Mobile Competence Centre; 650, Route Des Lucioles; F-06921 Sophia-Antipolis Cedex; France, vol. RAN WG1, No. Chongqing, P.R. China; Aug. 14, 2019-Aug. 20, 2019, Oct. 22, 2019 (Oct. 22, 2019), 26 Pages, XP051798598, Retrieved from the Internet: URL: https://ftp.3gpp.org/tsg_ran/WG1_RL1/TSGR1_98b/Docs/R1-1910592.zip R1-1910592_NR-Uchannel access FL summary v0_Thu eom.docx [retrieved on Oct. 22, 2019] section 6, pp. 16-18.
QUALCOMM Incorporated: "Channel Access Procedures for NR Unlicensed," 3GPP Draft, 3GPP TSG RAN WG1 Meeting #97, R1-1907261, 7.2.2.2.1, Channel Access Procedures for NR Unlicensed, 3rd Generation Partnership Project (3GPP), Mobile Competence Centre, 650, Route Des Lucioles, F-06921, Sophia-Antipolis Cedex, France, vol. RAN WG1, No. Reno, US; May 13, 2019-May 17, 2019, May 4, 2019 (May 4, 2019), XP051728701, 18 Pages, Retrieved from the Internet: URL: http://www.3gpp.org/ftp/Meetings%5F3GPP%5FSYNC/RAN1/Docs/R1%2D1907261%2Ezip.
VIVO: "Feature Lead Summary on Configured Grant Enhancement", 3GPP TSG RAN WG1#98bis, 3GPP Draft; R1-1910559 FL Summary on NRU-CG, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 10, 2019, Oct. 22, 2019 (Oct. 22, 2019), 20 Pages, XP051798593, Retrieved from the Internet: URL: https://ftp.3gpp.org/tsg_ran/WG1_RL1/TSGR1_98b/Docs/R1-1910559.zip R1-1910559 FLSummary on NRU-CG.docx [retrieved on Oct. 22, 2019] Section 5.3, Section 4.2.
VIVO: "Outcome of Offline Discussion on Configured Grant Enhancement", 3GPP TSG RAN WG1 #96, 3GPP Draft; R1-1903476, 3rd Generation Partnership Project (3GPP), Mobile Competence Centre; 650, Route Des Lucioles; F-06921 Sophia Antipolis Cedex; France, Mar. 1, 2019 (Mar. 1, 2019), Athens, Greece, Feb. 25, 2019-Mar. 1, 2019, 15 Pages, XP051601141, Retrieved from the Internet: URL: http://www.3gpp.org/ftp/tsg%5Fran/WG1%5FRL1ITSGR1%5F96/Docs/R1%2D1903476%2Ezip section 4.1, pp. 9-10.
Intel Corporation: "Summary of Email Discussion [90b-LTE-21] on AUL Channel Access", 3GPP TSG RAN WG1 Meeting #91, R1-1720029, Reno, US, Nov. 27, 2017-Dec. 1, 2017, Nov. 18, 2017, pp. 1-14.
Taiwan Search Report—TW109138844—TIPO—Nov. 24, 2023.
Intel Corporation: "Enhancements to Configured Grants for NR-Unlicensed", 3GPP TSG RAN WG1 Meeting #98bis, R1-1910643, Chongqing, China, October Oct. 14, 2019-Oct. 20, 2019, Oct. 8, 2019, pp. 1-14.
Mediatek Inc: "Discussion on NR-U Configured Grant", 3GPP TSG RAN WG1 #98bis, R1-1911055, Chongqing, China, Oct. 14, 2019-Oct. 20, 2019, Oct. 8, 2019, 4 pages.
Nokia, et al., "On Support of UL Transmission with Configured Grants in NR-U", 3GPP TSG RAN WG1 Meeting #98bis, R1-1910595, Chongqing, P.R. China, Oct. 14, 2019-Oct. 20, 2019, Oct. 7, 2019, 9 pages.
QUALCOMM Incorporated: "Channel Access Procedures for NR Unlicensed", 3GPP TSG RAN WG1 Meeting #98bis, R1-1911097, Chongqing, CN, Oct. 14, 2019-Oct. 20, 2019, Oct. 5, 2019, pp. 1-18.

* cited by examiner

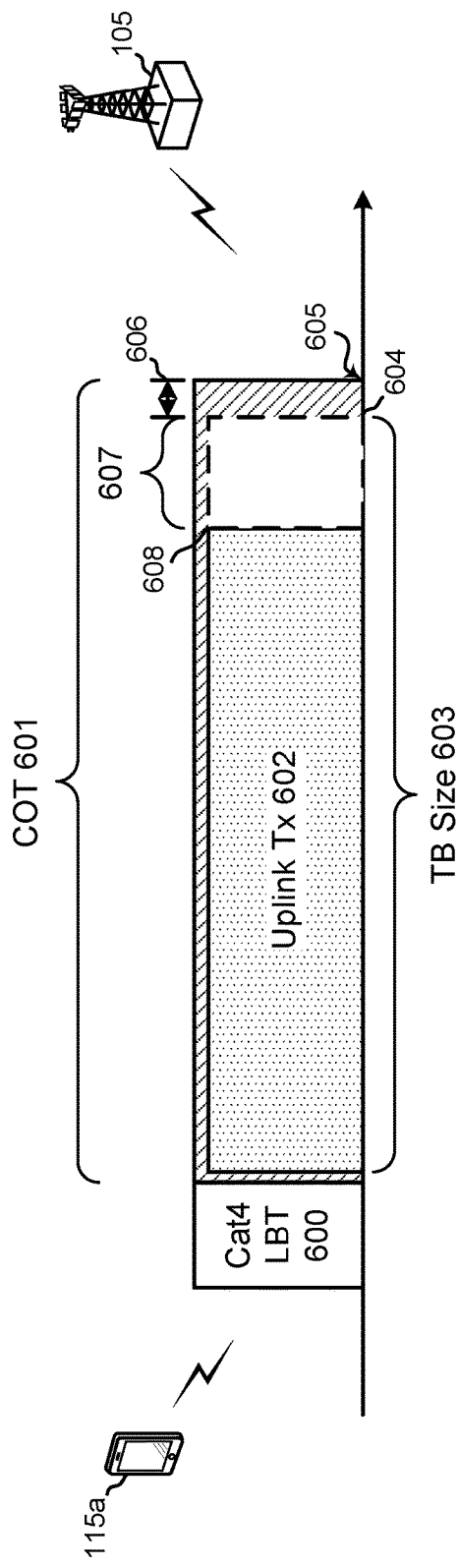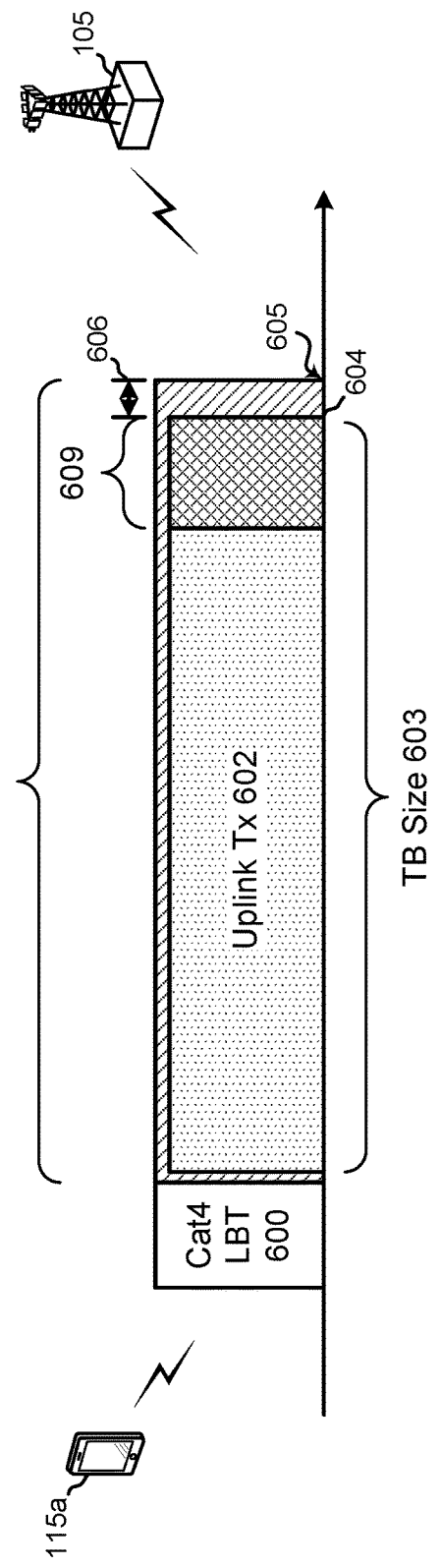

CONFIGURED GRANT CHANNEL OCCUPANCY TIME SHARING PROCEDURE

CROSS-REFERENCE TO RELATED APPLICATIONS

This application claims the benefit of International Patent Application No. PCT/US2020/059220, entitled, "CONFIGURED GRANT CHANNEL OCCUPANCY TIME SHARING PROCEDURE," filed on Nov. 5, 2020, and also claims the benefit of India Provisional Patent Application No. 201941045481, entitled, "CONFIGURED GRANT CHANNEL OCCUPANCY TIME SHARING PROCEDURE," filed on Nov. 8, 2019, which is expressly incorporated by reference herein in its entirety.

BACKGROUND

Field

Aspects of the present disclosure relate generally to wireless communication systems, and more particularly, to configured grant channel occupancy time (COT) sharing procedure.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes acquiring, by a user equipment (UE), a channel occupancy time (COT) in response to success detected of a listen before talk (LBT) procedure of the UE on a shared communication channel, determining, by the UE, whether COT sharing is one of enabled or not enabled, identifying, by the UE, COT sharing information for communication to a serving base station within an uplink control message, wherein the COT sharing information is identified in response to the determining, and transmitting, by the UE, the uplink control message with the COT sharing information to the serving base station.

In an additional aspect of the disclosure, an apparatus configured for wireless communication includes means for acquiring, by a UE, a COT in response to success detected of a LBT procedure of the UE on a shared communication channel, means for determining, by the UE, whether COT sharing is one of enabled or not enabled, means for identifying, by the UE, COT sharing information for communication to a serving base station within an uplink control message, wherein the COT sharing information is identified in response to the means for determining, and means for transmitting, by the UE, the uplink control message with the COT sharing information to the serving base station.

In an additional aspect of the disclosure, a non-transitory computer-readable medium having program code recorded thereon. The program code further includes code to acquire, by a UE, a COT in response to success detected of a LBT procedure of the UE on a shared communication channel, code to determine, by the UE, whether COT sharing is one of enabled or not enabled, code to identify, by the UE, COT sharing information for communication to a serving base station within an uplink control message, wherein the COT sharing information is identified in response to execution of the code to determine, and code to transmit, by the UE, the uplink control message with the COT sharing information to the serving base station.

In an additional aspect of the disclosure, an apparatus configured for wireless communication is disclosed. The apparatus includes at least one processor, and a memory coupled to the processor. The processor is configured to acquire, by a UE, a COT in response to success detected of a LBT procedure of the UE on a shared communication channel, to determine, by the UE, whether COT sharing is one of enabled or not enabled, to identify, by the UE, COT sharing information for communication to a serving base station within an uplink control message, wherein the COT sharing information is identified in response to execution of the configuration of the at least one processor to determine, and to transmit, by the UE, the uplink control message with the COT sharing information to the serving base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 6A-6C are block diagrams illustrating a UE and base station having COT sharing capabilities configured according to one aspect of the present disclosure.

DETAILED DESCRIPTION

Figure 1:
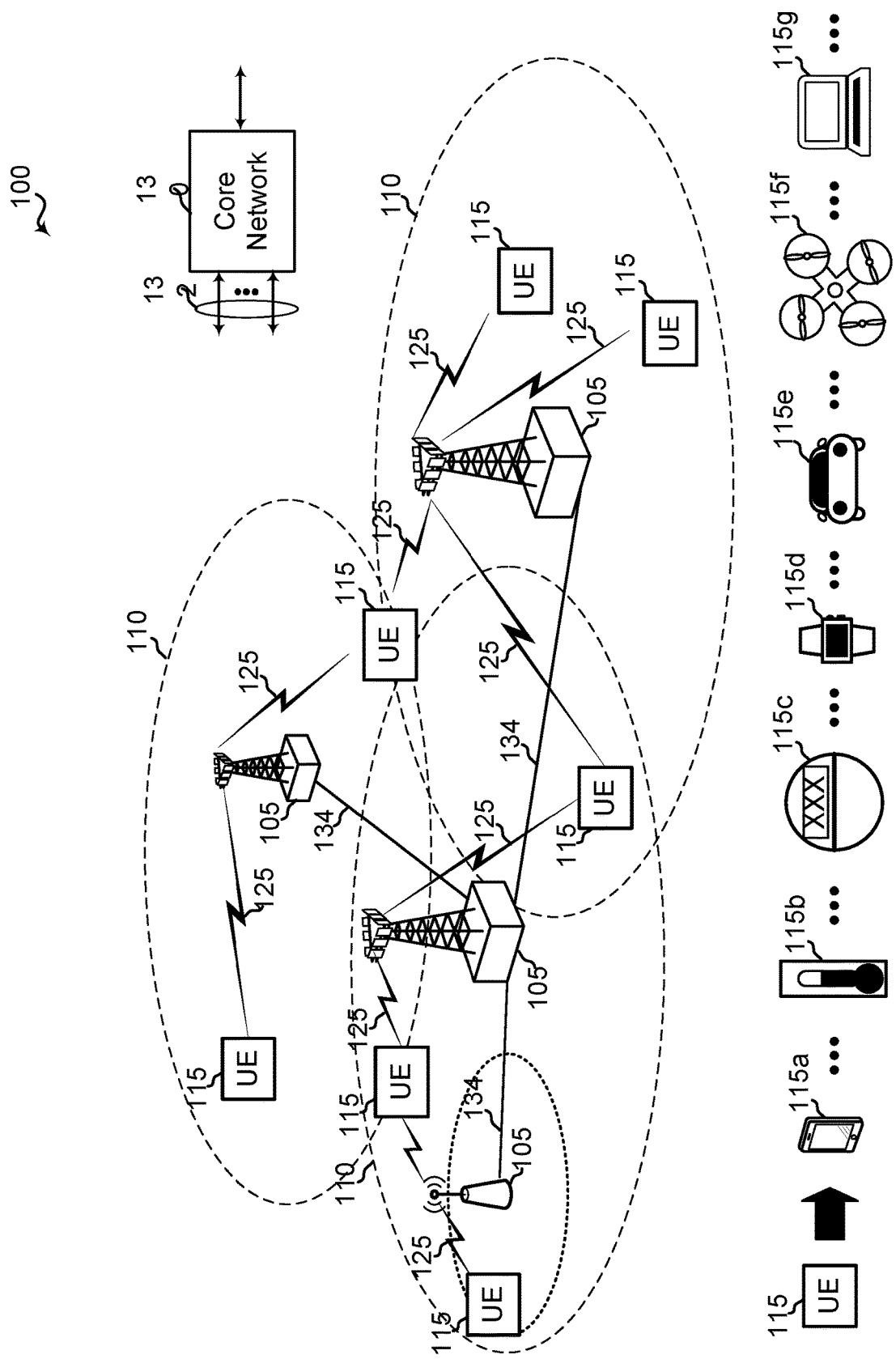
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports configured grant (CG) channel occupancy time (COT) sharing in accordance with aspects of the present disclosure. A UE, such as UE 115, sharing a COT may indicate in the uplink control indicator (UCI) the remaining COT duration, an offset indication identifying where the uplink transmission is expected to end, and a channel access priority class (CAPC) which may be used by a base station, such as base station 105 to determine which type of data may be included in downlink transmissions in the shared COT. Where the energy detection (ED) threshold has not been configured for COT sharing, UE 115 may reduce the information included in the UCI. Base station 112 may alternatively configured which information for UE 115 to include in the UCI for potential COT sharing. The COT sharing information may further be compressed by coding such information into tables or leveraging knowledge of transmission characteristics, such as configured end points. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
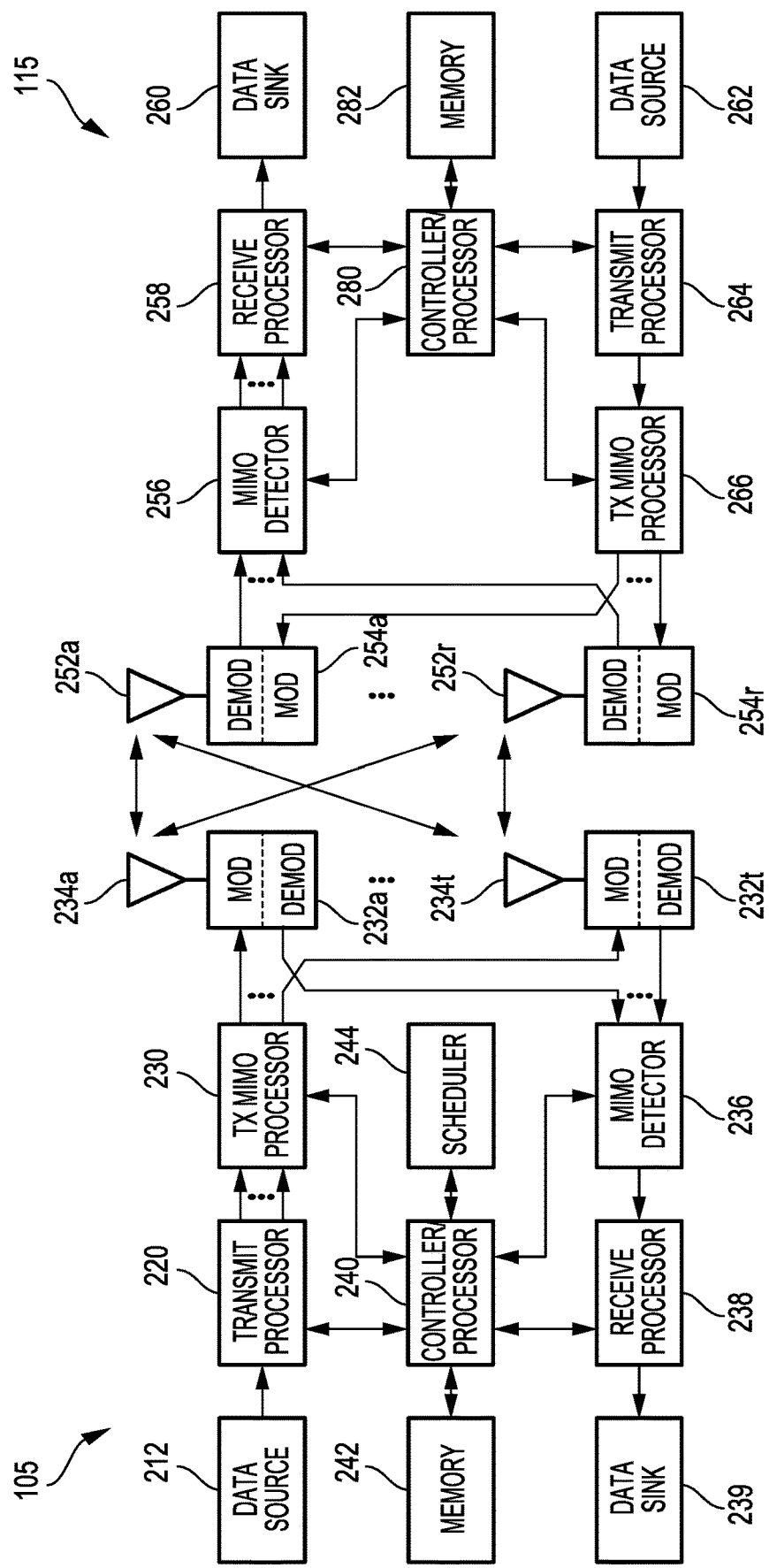
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 3, and/or other processes for the techniques described herein. The memories 242 and 282 may store data and program codes for the base station 105 and the UE 115, respectively. A scheduler 244 may schedule UEs for data transmission on the downlink and/or uplink.

In NR-U operations, channel occupancy time (COT) sharing has been considered in the context of configured grant (CG) resources. Each CG resource may include periodic uplink resources and may be associated with a set of hybrid automated repeat request (HARD) identities. Before each uplink transmission within the CG resources, a UE may perform a Cat-4 LBT to secure access to the shared communication channel. The UE can transmit multiple uplink transmissions (e.g., PUSCH) without any transmission gap after the LBT succeeds and until the end of the COT. A COT acquired by a UE can be shared with a serving base station to transmit or broadcast control or data transmissions to the UE. COT sharing may be useful when the UE does not perform uplink transmissions for the entire COT duration. A serving base station can share the COT by performing either an abbreviated LBT (e.g., Cat-2 LBT) or without performing an LBT procedure. In order to allow COT sharing, the UE can provide COT sharing information within an uplink control indicator (UCI) message about the acquired COT. Various aspects of the present disclosure are directed to identification and use of such CG-UCI information related to COT sharing and performing the CG UL transmissions in a manner that allows the serving base station to conduct the abbreviated LBT.

Figure 3:
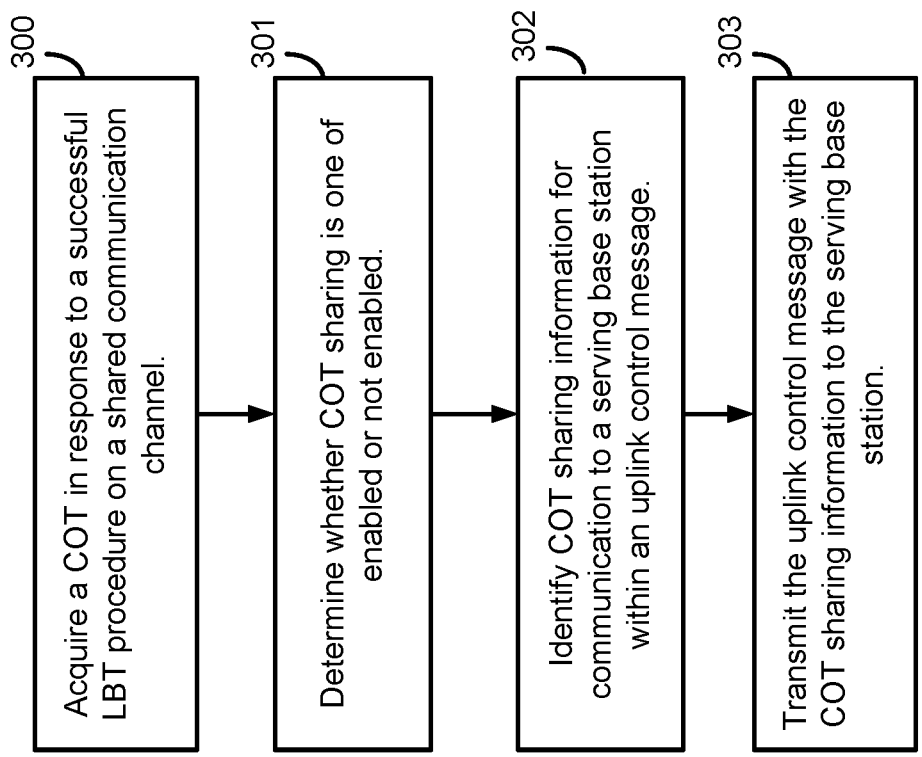
FIG. 3 is a block diagram illustrating example blocks executed to implement one aspect of the present disclosure.

FIG. 3 is a block diagram illustrating example blocks executed to implement one aspect of the present disclosure.

Figure 7:
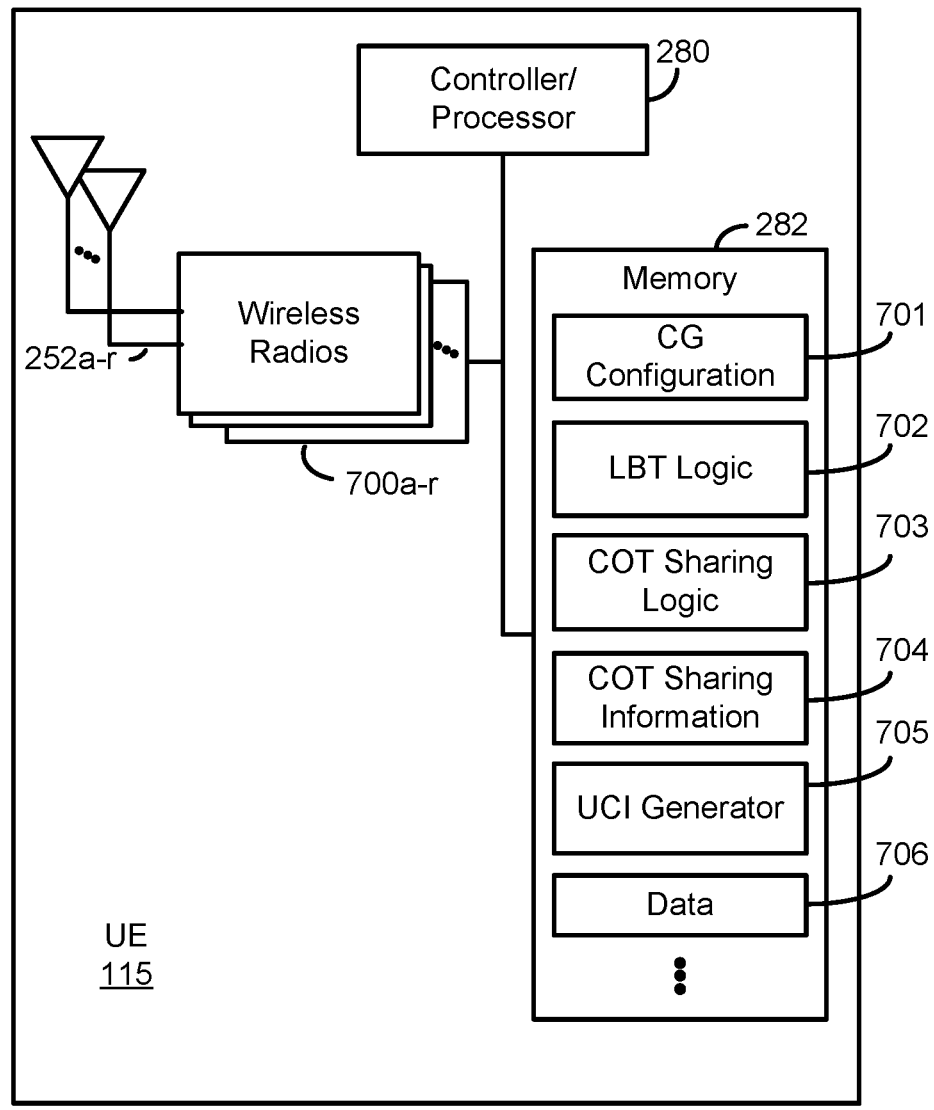
FIG. 7 is a block diagram illustrating an example UE configured according to aspects of the present disclosure.

The example blocks will also be described with respect to UE 115 as illustrated in FIGS. 2 and 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 700a-r and antennas 252a-r. Wireless radios 700a-r includes various components and hardware, as illustrated in FIG. 2 for UE 115, including modulator/demodulators 254a-r, MIMO detector 256, receive processor 258, transmit processor 264, and TX MIMO processor 266.

At block 300, a UE acquires a COT in response to success detected of an LBT procedure of the UE on a shared communication channel. A UE, such as UE 115, obtains and stores configured grant configuration information in memory 282 at configured grant configuration 701. UE 115 may receive such configured grant configuration information from configuration signals by a serving base station via antennas 252a-r and wireless radios 700a-r. Configured grant configuration 701 provides UE 115 with identification of the resources, starting points, ending points, etc., for UE 115 to transmit uplink data without a scheduled grant when uplink data is present in data buffer 706, in memory 282. Having knowledge of configured grant uplink resources on a shared communication spectrum, UE 115 may attempt to secure a COT by executing LBT logic 702, in memory 282. Under control of controller/processor 280, UE 115 executes LBT logic 702 which results in instructions and control over various components of UE 115, such as illustrated in greater detail in FIG. 2, in addition to wireless radios 700a-r and antennas 252a-r. When executing LBT logic 702, the environment created within UE 115 in executing the instructions and controlling the various hardware and components (the "execution environment"), UE 115 may monitor the shared communication channel via antennas 252a-r and wireless radios 700a-r to detect energy levels on the shared communication channel. If no energy levels above the energy detection (ED) threshold are detected, then UE 115 may, within the execution environment of LBT logic 702, detect success of the LBT procedure. Upon detection of the successful LBT procedure, UE 115 acquires a COT on the shared communication channel.

At block 301, the UE determines whether COT sharing is one of enabled or not enabled. In order to support COT sharing, UE 115, under control of controller/processor 280, executes COT sharing logic 703, stored in memory 282. The execution environment of COT sharing logic 703, provides UE 115 with the functionality and control of various hardware and components to determine whether COT sharing has been enabled and, if enabled, to monitor its transmissions in order to share the UE-initiated COT with the serving base station, when UE 115 will not be transmitting over the entire COT. In one example aspect, within the execution environment of COT sharing logic 703, UE 115 may detect whether the ED threshold for the LBT procedure used in accordance with LBT logic 702 to acquire the COT is configured by the serving base station for COT sharing. If not, then UE 115 may determine that COT sharing is not enabled. Otherwise, if it is configured by the serving base station for COT sharing, UE 115 may determine COT sharing to be enabled. In additional aspects, the execution environment of COT sharing logic 703 may operate to prompt UE 115 to detect configuration information received from the serving base station via antennas 252a-r and wireless radios 700a-r that either configures which COT sharing information should be included in the uplink control message to the serving base station or configures COT sharing as either enabled or not enabled. Based on these additional serving base station configurations, UE 115 would determine whether or not COT sharing has been enabled.

At block 302, the UE identifies COT sharing information for communication to a serving base station within an uplink control message, wherein the COT sharing information is identified in response to the determining. COT sharing information 704, stored in memory 282, may be identified as the particular COT sharing information to be shared between UE 115 and the serving base station depending on whether COT sharing is enabled. COT sharing information 704 may include the remaining COT duration or COT end point which indicate to the serving base station how long a downlink transmission can be performed, an offset indication indicating where the UE transmission is expected to end or at what time instance the base station can perform the abbreviated LBT; and the channel access priority class (CAPC) used by the UE for COT acquisition. The CAPC allows the serving base station to determine which type of data can be included in its downlink communications within the shared COT. When UE 115 determines that COT sharing has been enabled, it may include all of this COT sharing information into an uplink control message. Moreover, COT sharing information 704 may be coded or compressed in order to reduce the signalling overhead of the information to include in the uplink control message. When UE 115 determines that COT sharing has not been enabled, it may identify some of this COT sharing information to remove from the uplink control message. For example, when not enabled for COT sharing, UE 115 would not identify the CAPC and, perhaps other of the COT sharing information for inclusion in the uplink control message. Once the COT sharing information has been identified, based on whether or not COT sharing is enabled, UE 115, under control of controller/processor 280, executes UCI generator 705, in memory 282. The execution of UCI generator 705 provides UE 115 with the functionality and instructions to generate the uplink control message that includes the identified COT sharing information.

At block 303, the UE transmits, the uplink control message with the COT sharing information to the serving base station. Once the uplink control message has been generated via execution of UCI generator 705 and includes the identified COT sharing information, UE 115, under control of controller/processor 280, may transmit the uplink control message to the serving base station via wireless radios 700a-r and antennas 252a-r.

Figure 4:
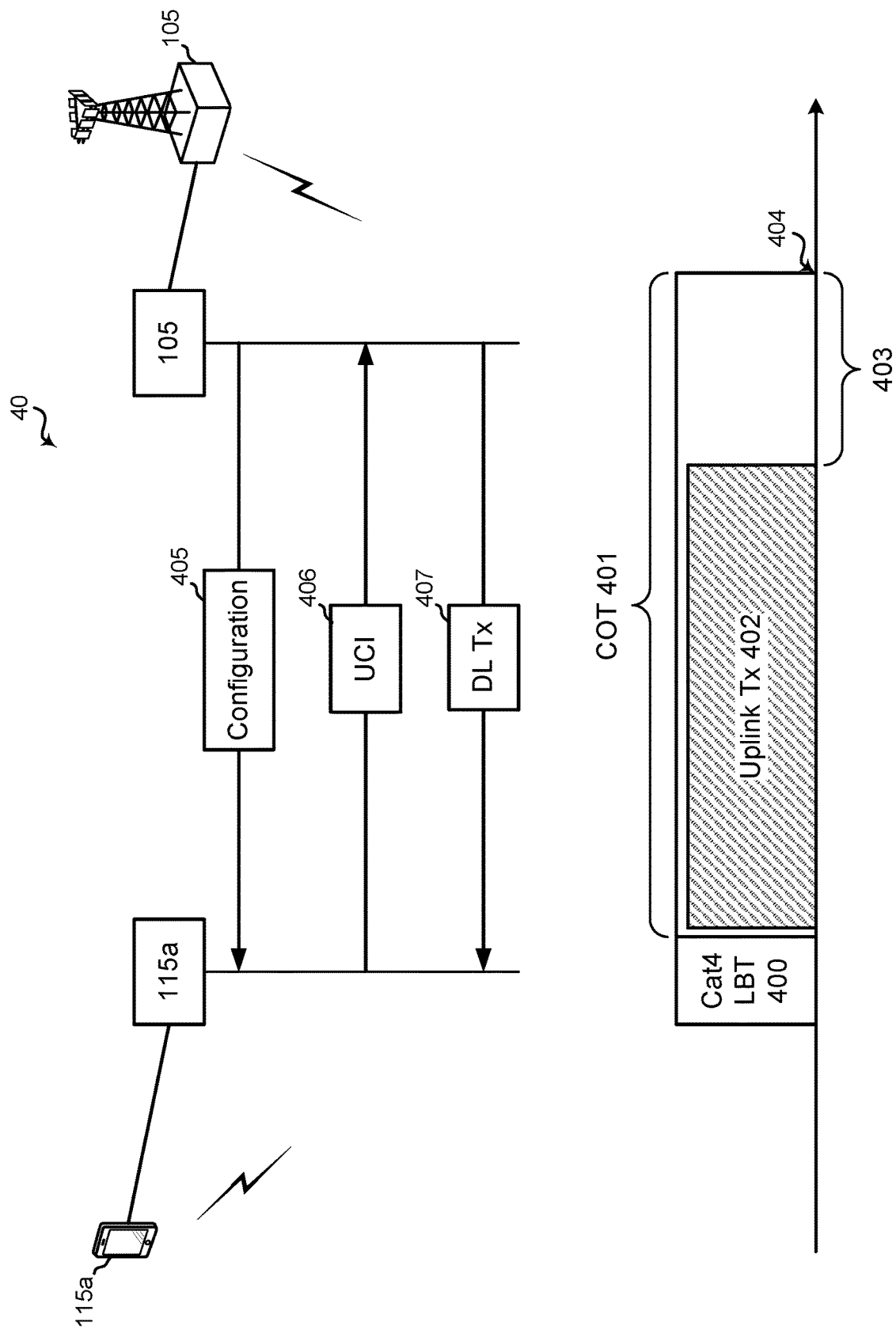
FIG. 4 is a block diagram illustrating a communication dialog between a UE and base station having capability of channel occupancy time (COT) sharing configured according to one aspect of the present disclosure.

FIG. 4 is a block diagram illustrating a communication dialog between a UE 115a and base station 105 having capability of COT sharing configured according to one aspect of the present disclosure. UE 115a receives various configuration information 405 from base station 105. Base station 105 may provide indication of the configured grant resources available to UE 115a within a shared communication channel. In order to attempt access to the shared communication channel, UE 115a performs a Cat-4 LBT 400. If successful, UE 115a acquires COT 401 for uplink transmissions 402.

It has been suggested that COT sharing can be impacted based on the value of the energy detection (ED) threshold configured by the base station. The ED threshold applied by UE 115a when performing Cat-4 LBT 400 to acquire COT 401 that can be shared with a serving base station, such as base station 105, is configured by base station 105 via configuration information 405, such as via RRC signaling and the like. Base station 105 may either configure the ED threshold for COT sharing, configure a standard ED threshold not intended for COT sharing or simply not configure the ED threshold for COT sharing. If not configured, UE 115a would default to using the standard ED threshold not intended for COT sharing when performing Cat-4 LBT 400 procedure to secure COT 401 on the shared communication channel.

When the ED threshold is not configured for COT sharing, base station 105 may still conduct downlink transmissions 407 within remaining COT duration 403 when UE 115a stops uplink transmissions 402 before the end point 404 of COT 401. However, in such a scenario, downlink transmissions 407 of base station 105 in UE-initiated COT 401 may be limited to control signals, broadcast signals, or control or broadcast channel transmissions of up to 2, 4, or 8 OFDM symbols in duration for subcarrier spacings of 15, 30, or 60 kHz subcarrier spacing (SCS), respectively. In such scenarios, when COT sharing has not been enabled, some of the COT sharing information provided within uplink control indicator (UCI) message 406 may be redundant (e.g., CAPC, COT duration, etc.). Moreover, in some cases, base station 105 may not be interested in COT sharing. Thus, UE 115a may determine which of the fields of COT sharing information can be included in UCI 406 based on configuration information 405 from base station 105.

According to one aspect of the present disclosure, the COT sharing information to be included within the configured grant uplink control message, UCI 406, may be dependent on whether or not the COT sharing ED threshold is configured. When the COT sharing ED threshold is not configured, UE 115a may withhold or remove the CAPC, and reduce the bitwidth of the remaining COT duration in UCI 406. In one example implementation, UE 115a may remove the COT duration field altogether. However, UE 115a should still ensure that there is sufficient space in COT 401 to allow the serving base station to send downlink transmissions 407 by limiting its uplink transmissions 402. In another example implementation, UE 115a may include a 1-bit value in UCI 406 that indicates whether base station 105 is allowed to transmit or broadcast control or data signaling using COT 401 acquired by UE 115a. This can be determined based on whether remaining COT duration 403 is sufficient for broadcast or control transmissions. In another example implementation, UE 115a may include the number of symbols available for broadcast or control transmissions within COT 401 acquired by UE 115a with UCI 406. This number can be based on a reference numerology (e.g., highest SCS supported by UE 115a or 60 kHz or SCS of active BWP).

According to another aspect of the present disclosure, base station 105 can directly configure UE 115a with which fields to include within UCI 406. For example, base station 105 can indicate in configuration information 405 whether to include the CAPC or not and can also indicate the granularity of remaining COT duration 403. Based on such information, UE 115 can determine whether COT sharing is enabled by base station 105 or not. For example, if the CAPC and remaining COT duration 403 or COT end 404 are excluded from the uplink control message (e.g., UCI 406), UE 115a may assume that COT sharing is disabled. In such case, UE 115a will then use the standard ED threshold that is not configured for sharing instead of the COT sharing ED threshold.

According to another aspect of the present disclosure, the serving base station, base station 105, may directly configure UE 115a via configuration information 405 whether or not COT sharing is enabled. Based on this enablement configuration, UE 115a can determine which COT sharing information fields are to be included within UCI 406. When base station 105 configures COT sharing to be enabled in configuration information 405, UE 115a may use the COT sharing ED threshold, but, when base station 105 configures COT sharing to be not enabled in configuration information 405, UE 115a may then use the standard ED threshold instead of the COT sharing ED threshold.

It should be noted that UE 115a can begin configured grant transmission, uplink transmissions 042, within a slot, such as when based on a mini-slot configuration and the addition of a cyclic prefix (CP). Thus, the time instance of COT end 404 may also use the same granularity as the PUSCH transmission start points. This may result in a higher signaling overhead for the remaining COT duration field if the number of PUSCH start points are large within a slot. Similarly, UE 115a may end configured grant transmissions, uplink transmissions 402, at any symbol within a slot if COT end 404 occurs in the given symbol within the slot. Thus, the number of COT sharing information bits can be large even to indicate the transmission end offset value within UCI 406. Additional aspects of the present disclosure are directed to compressing this type of COT sharing information.

In one aspect of the present disclosure, UE 115a may reduce the signaling of remaining COT duration 403 and the remaining transmission time within UCI 406. Since, the transmission end time would occur earlier than COT end 404, UE 115a can jointly code and compress this information to UCI 406. Similarly the CAPC can also be jointly compressed as transmission end point is impacted based on the chosen CAPC value. For different CAPC, the COT duration may be different. For greater flexibility, a resource indicator value (MV) table can be used to compress the signaling information for the transmission end time, the end of COT, and the CAPC. Each entry to the MV table can provide a combination of CAPC, remaining transmission time, and remaining COT duration. Each of UE 115a and base station 105 have copies of this MV table. The MV table can further use a granularity of slots, multiple symbols, or a mini-slot level. To further compress signaling of the remaining transmission time, the signaling can make use of the fact that the uplink transmission ends at a PUSCH end boundary configured by base station 105 in configuration information 405. The signaling of remaining COT duration 403 can also be compressed by making use of the fact that PUSCH starting locations are limited by base station configuration. For example, the MV table entries may have a granularity of PUSCH slot end boundaries and PUSCH starting points for the remaining transmission time and remaining COT duration, respectively. UE 115a would include the index to the RIV table associated with the desired entry and collection of COT sharing information to include in UCI 406.

In another aspect of the present disclosure, the transmission end point and remaining COT duration may be jointly coded by using a start-length indicator value (SLIV) approach. In a first example implementation, the start value and length value of the SLIV may have the granularity of PUSCH end points and PUSCH start points configured by base station 105, respectively. In a second example implementation, the SLIV table can provide an end point offset and remaining COT duration in a coarser granularity, such as with both start value and length value being provided in order on slots, or with the start value having the granularity of PUSCH transmission end points configured by base station 105 in configuration information 405, and the length value having the granularity of slots, or with the start value having the granularity of slots and the length value having the granularity of PUSCH start points. If no other information is provided, base station 105 may work with approximate values. Here again, UE 115 would include the index to the SLIV table in UCI 406 that points to the desired set of start-length indicator values. Base station 105 would use the receive index to identify the correct entry in the SLIV table at base station 105.

It should be noted that additional aspects of the present disclosure may provide for UE 115a to include additional COT sharing information fields within UCI 406 to provide corrections to the SLIV table indicated values. For example, the exact transmission end point within the slot can be indicated in a separate field in UCI 406, in which the bitwidth can be determined based on the allowed PUSCH transmission end points within a slot. Additionally, the exact COT end 404 within the slot can be indicated based on a granularity of PUSCH transmission start points.

Additional aspects of the present disclosure are directed to individually compressing both transmission end point and remaining COT duration 403. The COT duration bitwidth can be derived based on a PUSCH starting point granularity. For example, UE 115a can indicate the number of slots left in addition to the ending symbol within the slot in UCI 406, which bitwidth may be based on mini-slot starting points, as configured by base station 105 in configuration information 405. The offset indicator identifying the end of uplink transmissions 402 can also be compressed, such as by allowing UE 115a to end its transmission at the base station-configured PUSCH end points. In such aspect, UE 115a would indicate the ending slot number and ending symbol within the slot in UCI 406 which bitwidth can be based on PUSCH end points configured by base station 105 in configuration information 405. In an additional example implementation, UE 115a may be allowed to end its uplink transmissions 402 at either the slot end or within a slot, when COT end 404 falls within a slot. UE 115a may indicate this ending point in the number of slots, and, if the ending point occurs before COT end 404, then the base station may assume the slot boundary end. Otherwise, base station 105 may determine the ending symbol based on remaining COT duration 403.

Figure 5:
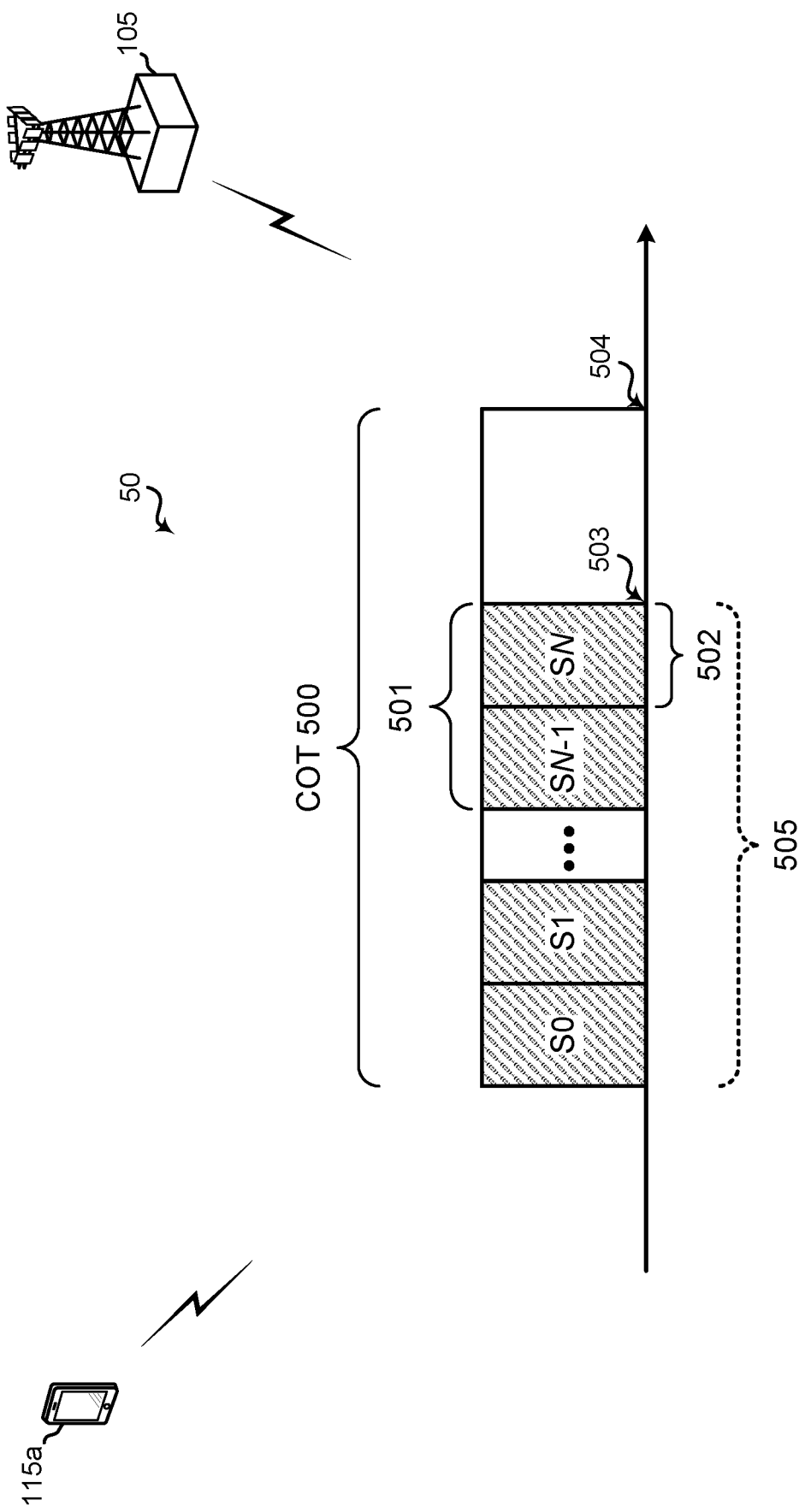
FIG. 5 is a block diagram illustrating a portion of NR-U network including a UE and a base station having COT sharing capabilities configured according to one aspect of the present disclosure.

FIG. 5 is a block diagram illustrating a portion of NR-U network 50 including UE 115a and base station 105 having COT sharing capabilities configured according to one aspect of the present disclosure. In an additional aspect of the present disclosure, UE 115a may be configured to signal the COT sharing information at a fixed position before the end of the uplink transmission. For example, UE 115a could signal the COT sharing information in UCI messages within the PUSCH transmission occurring in the two slots, SN−1 and SN, before the ending point 503 of the uplink transmission. Thus, if UE 115a uses 10 slots for its uplink transmission in COT 500, the first eight slots may include a UCI that indicates no COT sharing (e.g., remaining COT duration=0), while in the last two slots, SN−1 and SN, UE 115a may include a UCI that indicates the COT sharing information and that COT sharing will occur after a certain number of slots or after the current slot, respectively. Ending point 503 of the uplink transmission would be calculated from these last two slots, SN−1 and SN, thus, the number of bits used for such an indication may decrease significantly. For example, if UE 115a were reporting UCI indicating COT sharing from the first slot, S0, the length until ending point 503 is 505, while indicating COT sharing in the last two slots, SN−1 and SN, represents lengths 501 and 502, respectively, which are much shorter in length than length 505. This method can also be used to reduce the bitwidth for indicating the remaining COT duration signaling.

It should be noted that this method of reducing the bitwidth of certain COT sharing information may imply blind decoding from network because base station 105 does not know the particular format of UCI used by UE 115a for a given slot.

When an opportunity to share the UE-initiated COT arises, the serving base station may perform an abbreviated LBT procedure (e.g., 25 µs or 16 µs Cat-2 LBT) or no-LBT before initiating the downlink transmission. Which LBT the base station performs may be determined based on the LBT capabilities supported by the base station. For any LBT type, the UE would be aware to provide a sufficient gap between the end of the uplink transmission and the end of the COT for the base station to perform the appropriate LBT procedure. For example, for a 25 µs Cat-2 LBT, the UE would terminate its uplink transmission at least 25 µs before the slot or mini-slot boundary.

Figure 6C:
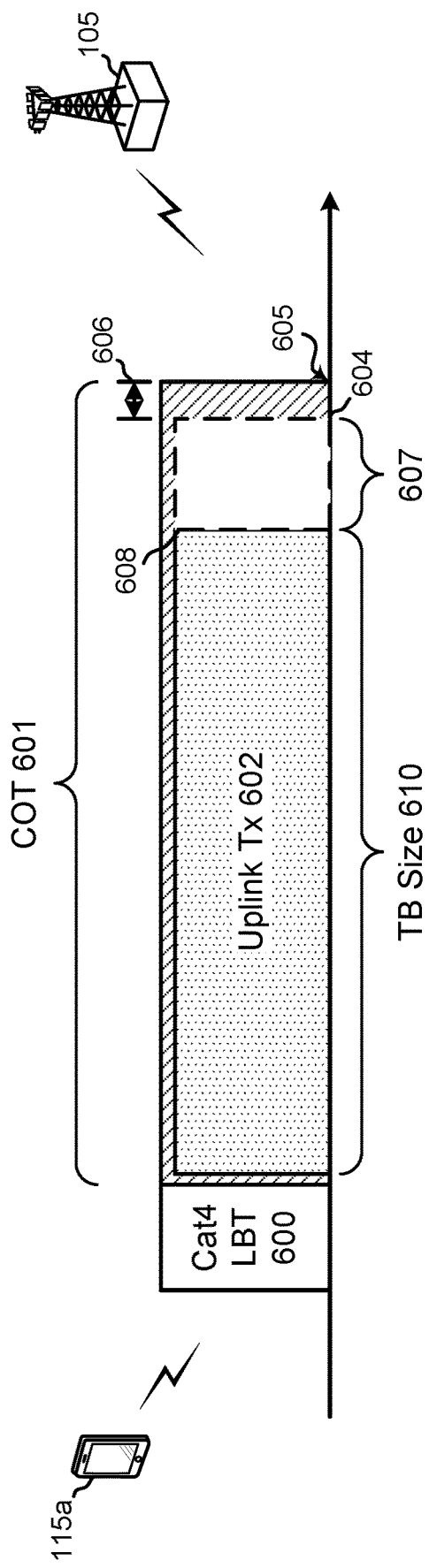

FIGS. 6A-6C are block diagrams illustrating UE 115a and base station 105 having COT sharing capabilities configured according to aspects of the present disclosure. UE 115a successfully conducts Cat-4 LBT 600 to acquire COT 601 in the shared communication channel to COT end 605. When UE 115a terminates uplink transmission 602 at a point earlier than the slot or mini-slot or PUSCH boundary, UE 115a may determine the transmission block (TB) size 603 in multiple ways. For example, as illustrated in FIG. 6A, TB size 603 may be selected based on the original ending point 604, such as the configured PUSCH boundary, with a rate matching performed based on the pulled-in ending point 608. The "pulled-in" ending point 608 represents the ending point selected by UE 115a to provide base station 105 with sufficient time to perform the base station LBT procedure. Gap 606 between original ending point 604 and the next available downlink opportunity (not shown), is insufficient for base station 105 to perform an abbreviated LBT procedure. This prompts UE 115a to pull in the end point of uplink transmission 602 to pulled-in ending point 608. The additional time gap 607 in addition to gap 606 provides base station 105 with sufficient time to perform its LBT procedure for downlink transmissions.

In a second example implementation illustrated in FIG. 6B, TB size 603 may be selected based on original ending point 604, with rate matching performed based on original ending point 604, and puncturing the remaining symbols 609 (between pulled-in ending point 608 and original ending point 604) for base station 105 to perform its LBT procedure. In a third example implementation illustrated in FIG. 6C, TB size 610 may be selected based on pulled-in ending point 608 with the rate matching performed based on pulled-in ending point 608.

In a further aspect, configured grant UCI multiplexing may be performed either assuming the smaller number of symbols used for uplink transmission independent of actual number symbols used for uplink transmission, assuming the actual number of symbols used for uplink transmission, or assuming the larger number of symbols used for uplink transmission.

Alternatively, the base station can configure multiple configurations with different ending points. The UE may then select one of the configurations and report the selection in the UCI message. In one example implementation of base station configuration, the UE selects all slots with all symbols (0 to 13). In another example implementation of the base station configuration, the UE may select all slots with symbols 0 to 12 in every slot. In a further example implementation of base station configuration, the UE may select slots 0 to N−1 with all symbols, slot N with symbols 0 to 12 (where N is last transmission slot used by UE for uplink transmission).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 3 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspect of the present disclosure may be implemented in multiple different aspect and optional implementations. For example, a first aspect of wireless communication according to the present disclosure may comprise acquiring, by a UE, a COT in response to success detected of a LBT procedure of the UE on a shared communication channel; determining, by the UE, whether COT sharing is one of enabled or not enabled; identifying, by the UE, COT sharing information for communication to a serving base station within an uplink control message, wherein the COT sharing information is identified in response to the determining; and transmitting, by the UE, the uplink control message with the COT sharing information to the serving base station.

A second aspect, based on the first aspect, wherein the COT sharing information includes one or more of a remaining COT duration from an end of one of a UE uplink transmission during the COT or a PUSCH transmission containing the COT sharing information to an endpoint of the COT; an offset indication identifying the end of the UE uplink transmission; and a CAPC used by the UE for acquisition of the COT.

A third aspect, based on the second aspect, wherein the determining includes identifying an ED threshold configuration of the UE; determining that the COT sharing is enabled in response to identification of the ED threshold configuration as configured for sharing; and determining that the COT sharing is not enabled in response to identification of the ED threshold configuration as not configured for sharing.

A fourth aspect, based on the third aspect, wherein the identifying the COT sharing information includes one of identifying the remaining COT duration, the offset indication, and the CAPC for the uplink control message when the COT sharing is determined to be enabled; or identifying for the uplink control message when the COT sharing is determined to be not enabled, the offset indication and one or more of removal of the CAPC; the remaining COT duration; a 1-bit flag indicating whether the serving base station is allowed to transmit during a remainder of the COT; or an indication of a number of symbols available for transmission by the serving base station.

A fifth aspect, based on the second aspect, wherein the determining includes receiving a configuration message from the serving base station, wherein the configuration message includes identification of the COT sharing information to include in the uplink control message; and determining whether the COT sharing is one of enabled or not enabled based on the identification of the COT sharing information in the configuration message.

A sixth aspect, based on the fifth aspect, wherein the determining whether the COT sharing is one of enabled or not enabled includes identifying the configuration message indicates exclusion of the CAPC and the remaining COT duration from the uplink control message, wherein the UE determines the COT sharing is not enabled in response to the identifying the configuration message.

A seventh aspect, based on the sixth aspect, further including using, by the UE, an ED threshold configuration for the LBT procedure not configured for sharing in response to identification of the COT sharing as not enabled.

An eighth aspect, based on the second aspect, wherein the determining includes receiving a configuration message from the serving base station, wherein the configuration message indicates whether the COT sharing is one of enabled or not enabled.

A ninth aspect, based on the eighth aspect, further including using, by the UE, an ED threshold configuration for the LBT procedure not configured for sharing in response to identification of the COT sharing as not enabled.

A tenth aspect, based on the second aspect, wherein the COT sharing information includes an index to a table shared by the UE and the serving base station, wherein the table includes a plurality of entries each identifying one or more of the remaining COT duration, the offset indication indicated as a remaining transmission time, and the CAPC corresponding.

An eleventh aspect, based on the tenth aspect, wherein the table compresses the remaining COT duration and the remaining transmission time using a RIV.

A twelfth aspect, based on the eleventh aspect, wherein RIV indicates one or more of the remaining transmissions time as a PUSCH slot boundary where the UE uplink transmission will end; and the remaining COT duration has a granularity of starting locations of the UE uplink transmission as configured by the serving base station.

A thirteenth aspect, based on the tenth aspect, wherein the table jointly codes the remaining COT duration and the offset indication using a start and length indicator value (SLIV).

A fourteenth aspect, based on the thirteenth aspect, wherein a length value of the SLIV is indicated in a granularity of PUSCH transmission start points, wherein PUSCH start points are configured by the serving base station.

A fifteenth aspect, based on the thirteenth aspect, wherein a start value of the SLIV is indicated in a granularity of one of: slots or PUSCH transmission end points and the length value of the SLIV is indicated in a granularity of one of: slots or PUSCH transmission start points.

A sixteenth aspect, based on the thirteenth aspect, further including adding, by the UE, corrective information to the uplink control message, wherein the corrective information modifies one or more values in the table indicated by the SLIV.

A seventeenth aspect, based on the second aspect, further including compressing the remaining COT duration within the uplink control message, wherein the compressing the remaining COT duration includes indicating, by the UE, a number of COT slots remaining and an ending symbol in a last slot of the number of remaining COT slots; and compressing the offset indication within the uplink control message, wherein the compressing the offset indication includes one of indicating, by the UE, an ending slot number and a last symbol of the UE uplink transmission in the ending slot number; or indicating, by the UE, a number of remaining transmission slots.

An eighteenth aspect, based on the second aspect, further including obtaining, by the UE, a reporting location, wherein the reporting location identifies a number of slots before the end of the UE uplink transmission during which the transmitting the uplink control message with the COT sharing information to the serving base station is performed by the UE, wherein the remaining COT duration and the offset indication are calculated by the UE from the number of slots before the end of the UE uplink transmission.

A nineteenth aspect, based on the second aspect, further including determining, by the UE, a time gap between the end of the UE uplink transmission and a subsequent downlink transmission start occasion; ending, by the UE, the UE uplink transmission at the end of the UE uplink transmission in response to the time gap exceeding a minimum time for the serving base station to perform an abbreviated downlink LBT according to the LBT capability; and ending, by the UE, the UE uplink transmission at an ending period before the end of the UE uplink transmission in response to the minimum time exceeding the time gap, wherein an extended time gap between the ending period before the end of the UE uplink transmission is sufficient to accommodate the minimum time for the serving base station to perform the abbreviated LBT.

A twentieth aspect, based on the nineteenth aspect, further including determining, by the UE, a transport block size for the UE uplink transmission based on one of the end of the UE uplink transmission with rate matching based on the ending period before the end of the UE uplink transmission; the end of the UE uplink transmission with the rate matching based on the end of the UE uplink transmission, wherein the UE punctures resources associated with the extended time gap; or the ending period before the end of the UE uplink transmission with the rate matching based on the ending period before the end of the UE uplink transmission.

A twenty-first aspect, based on the twentieth aspect, wherein the transmitting the uplink control message includes multiplexing the uplink control message according to one of a first number of multiplex symbols fewer than an actual number of multiplex symbols based on the end of the UE uplink transmission used; the actual number of multiplex symbols based on the end of the UE uplink transmission used; or a second number of multiplex symbols greater than the actual number of multiplex symbols based on the end of the UE uplink transmission used.

A twenty-second aspect, based on the first aspect, further including obtaining, by the UE, a set of transmission configurations from the serving base station; selecting, by the UE, a transmission configuration from the set of transmission configurations; and adding, by the UE, a configuration indicator to the uplink control message, wherein the configuration indicator identifies the transmission configuration to the serving base station.

A twenty-third aspect configured for wireless communication may comprise means for acquiring, by a UE, a COT in response to success detected of a LBT procedure of the UE on a shared communication channel; means for determining, by the UE, whether COT sharing is one of enabled or not enabled; means for identifying, by the UE, COT sharing information for communication to a serving base station within an uplink control message, wherein the COT sharing information is identified in response to the means for determining; and means for transmitting, by the UE, the uplink control message with the COT sharing information to the serving base station.

A twenty-fourth aspect, based on the twenty-third aspect, wherein the COT sharing information includes one or more of a remaining COT duration from an end of one of a UE uplink transmission during the COT or a PUSCH transmission containing the COT sharing information to an endpoint of the COT; an offset indication identifying the end of the UE uplink transmission; and a CAPC used by the UE for acquisition of the COT.

A twenty-fifth aspect, based on the twenty-fourth aspect, wherein the means for determining includes means for identifying an energy detection (ED) threshold configuration of the UE; means for determining that the COT sharing is enabled in response to identification of the ED threshold configuration as configured for sharing; and means for determining that the COT sharing is not enabled in response to identification of the ED threshold configuration as not configured for sharing.

A twenty-sixth aspect, based on the twenty-fifth aspect, wherein the means for identifying the COT sharing information includes one of means for identifying the remaining COT duration, the offset indication, and the CAPC for the uplink control message when the COT sharing is determined to be enabled; or means for identifying for the uplink control message when the COT sharing is determined to be not enabled, the offset indication and one or more of removal of the CAPC; the remaining COT duration; a 1-bit flag indicating whether the serving base station is allowed to transmit during a remainder of the COT; or an indication of a number of symbols available for transmission by the serving base station.

A twenty-seventh aspect, based on the twenty-fourth aspect, wherein the means for determining includes means for receiving a configuration message from the serving base station, wherein the configuration message includes identification of the COT sharing information to include in the uplink control message; and means for determining whether the COT sharing is one of enabled or not enabled based on the identification of the COT sharing information in the configuration message.

A twenty-eighth aspect, based on the twenty-seventh aspect, wherein the means for determining whether the COT sharing is one of enabled or not enabled includes means for identifying the configuration message indicates exclusion of the CAPC and the remaining COT duration from the uplink control message, wherein the UE determines the COT sharing is not enabled in response to the identifying the configuration message.

A twenty-ninth aspect, based on the twenty-eighth aspect, further including means for using, by the UE, an energy detection (ED) threshold configuration for the LBT procedure not configured for sharing in response to identification of the COT sharing as not enabled.

A thirtieth aspect, based on the twenty-fourth aspect, wherein the means for determining includes means for receiving a configuration message from the serving base station, wherein the configuration message indicates whether the COT sharing is one of enabled or not enabled.

A thirty-first aspect, based on the thirtieth aspect, further including means for using, by the UE, an energy detection (ED) threshold configuration for the LBT procedure not configured for sharing in response to identification of the COT sharing as not enabled.

A thirty-second aspect, based on the twenty-fourth aspect, wherein the COT sharing information includes an index to a table shared by the UE and the serving base station, wherein the table includes a plurality of entries each identifying one or more of the remaining COT duration, the offset indication indicated as a remaining transmission time, and the CAPC corresponding.

A thirty-third aspect, based on the thirty-second aspect, wherein the table compresses the remaining COT duration and the remaining transmission time using a resource indicator value (MV).

A thirty-fourth aspect, based on the thirty-third aspect, wherein RIV indicates one or more of the remaining transmissions time as a PUSCH slot boundary where the UE uplink transmission will end; and the remaining COT duration has a granularity of starting locations of the UE uplink transmission as configured by the serving base station.

A thirty-fifth aspect, based on the thirty-second aspect, wherein the table jointly codes the remaining COT duration and the offset indication using a start and length indicator value (SLIV).

A thirty-sixth aspect, based on the thirty-fifth aspect, wherein a length value of the SLIV is indicated in a granularity of PUSCH transmission start points, wherein PUSCH start points are configured by the serving base station.

A thirty-seventh aspect, based on the thirty-fifth aspect, wherein a start value of the SLIV is indicated in a granularity of one of: slots or PUSCH transmission end points and the length value of the SLIV is indicated in a granularity of one of: slots or PUSCH transmission start points.

A thirty-eighth aspect, based on the thirty-fifth aspect, further including means for adding, by the UE, corrective information to the uplink control message, wherein the corrective information modifies one or more values in the table indicated by the SLIV.

A thirty-ninth aspect, based on the twenty-fourth aspect, further including means for compressing the remaining COT duration within the uplink control message, wherein the compressing the remaining COT duration includes indicating, by the UE, a number of COT slots remaining and an ending symbol in a last slot of the number of remaining COT slots; and means for compressing the offset indication within the uplink control message, wherein the means for compressing the offset indication includes one of means for indicating, by the UE, an ending slot number and a last symbol of the UE uplink transmission in the ending slot number; or means for indicating, by the UE, a number of remaining transmission slots.

A fortieth aspect, based on the twenty-fourth aspect, further including means for obtaining, by the UE, a reporting location, wherein the reporting location identifies a number of slots before the end of the UE uplink transmission during which the means for transmitting the uplink control message with the COT sharing information to the serving base station is performed by the UE, wherein the remaining COT duration and the offset indication are calculated by the UE from the number of slots before the end of the UE uplink transmission.

A forty-first aspect, based on the twenty-fourth aspect, further including means for determining, by the UE, a time gap between the end of the UE uplink transmission and a subsequent downlink transmission start occasion; means for ending, by the UE, the UE uplink transmission at the end of the UE uplink transmission in response to the time gap exceeding a minimum time for the serving base station to perform an abbreviated downlink LBT according to the LBT capability; and means for ending, by the UE, the UE uplink transmission at an ending period before the end of the UE uplink transmission in response to the minimum time exceeding the time gap, wherein an extended time gap between the ending period before the end of the UE uplink transmission is sufficient to accommodate the minimum time for the serving base station to perform the abbreviated LBT.

A forty-second aspect, based on the forty-first aspect, further including means for determining, by the UE, a transport block size for the UE uplink transmission based on one of the end of the UE uplink transmission with rate matching based on the ending period before the end of the UE uplink transmission; the end of the UE uplink transmission with the rate matching based on the end of the UE uplink transmission, wherein the UE punctures resources associated with the extended time gap; or the ending period before the end of the UE uplink transmission with the rate matching based on the ending period before the end of the UE uplink transmission.

A forty-third aspect, based on the forty-second aspect, wherein the means for transmitting the uplink control message includes means for multiplexing the uplink control message according to one of a first number of multiplex symbols fewer than an actual number of multiplex symbols based on the end of the UE uplink transmission used; the actual number of multiplex symbols based on the end of the UE uplink transmission used; or a second number of multiplex symbols greater than the actual number of multiplex symbols based on the end of the UE uplink transmission used.

A forty-fourth aspect, based on the twenty-third aspect, further including means for obtaining, by the UE, a set of transmission configurations from the serving base station; means for selecting, by the UE, a transmission configuration from the set of transmission configurations; and means for adding, by the UE, a configuration indicator to the uplink control message, wherein the configuration indicator identifies the transmission configuration to the serving base station.

A forty-fifth aspect may include a non-transitory computer-readable medium having program code recorded thereon, where the program code may comprise program code executable by a computer for causing the computer to acquire, by a UE, a COT in response to success detected of a LBT procedure of the UE on a shared communication channel; program code executable by the computer for causing the computer to determine, by the UE, whether COT sharing is one of enabled or not enabled; program code executable by the computer for causing the computer to identify, by the UE, COT sharing information for communication to a serving base station within an uplink control message, wherein the COT sharing information is identified in response to execution of the program code executable by the computer for causing the computer to determine; and program code executable by the computer for causing the computer to transmit, by the UE, the uplink control message with the COT sharing information to the serving base station.

A forty-sixth aspect, based on the forty-fifth aspect, wherein the COT sharing information includes one or more of a remaining COT duration from an end of one of a UE uplink transmission during the COT or a PUSCH transmission containing the COT sharing information to an endpoint of the COT; an offset indication identifying the end of the UE uplink transmission; and a CAPC used by the UE for acquisition of the COT.

A forty-seventh aspect, based on the forty-sixth aspect, wherein the program code executable by the computer for causing the computer to determine includes program code executable by the computer for causing the computer to identify an ED threshold configuration of the UE; program code executable by the computer for causing the computer to determine that the COT sharing is enabled in response to identification of the ED threshold configuration as configured for sharing; and program code executable by the computer for causing the computer to determine that the COT sharing is not enabled in response to identification of the ED threshold configuration as not configured for sharing.

A forty-eighth aspect, based on the forty-seventh aspect, wherein the program code executable by the computer for causing the computer to identify the COT sharing information includes one of program code executable by the computer for causing the computer to identify the remaining COT duration, the offset indication, and the CAPC for the uplink control message when the COT sharing is determined to be enabled; or program code executable by the computer for causing the computer to identify for the uplink control message when the COT sharing is determined to be not enabled, the offset indication and one or more of removal of the CAPC; the remaining COT duration; a 1-bit flag indicating whether the serving base station is allowed to transmit during a remainder of the COT; or an indication of a number of symbols available for transmission by the serving base station.

A forty-ninth aspect, based on the forty-sixth aspect, wherein the program code executable by the computer for causing the computer to determine includes program code executable by the computer for causing the computer to receive a configuration message from the serving base station, wherein the configuration message includes identification of the COT sharing information to include in the uplink control message; and program code executable by the computer for causing the computer to determine whether the COT sharing is one of enabled or not enabled based on the identification of the COT sharing information in the configuration message.

A fiftieth aspect, based on the forty-ninth aspect, wherein the program code executable by the computer for causing the computer to determine whether the COT sharing is one of enabled or not enabled includes program code executable by the computer for causing the computer to identify the configuration message indicates exclusion of the CAPC and the remaining COT duration from the uplink control message, wherein the UE determines the COT sharing is not enabled in response to execution of the program code executable by the computer for causing the computer to identify the configuration message.

A fifty-first aspect, based on the fiftieth aspect, further including program code executable by the computer for causing the computer to use, by the UE, an energy detection (ED) threshold configuration for the LBT procedure not configured for sharing in response to identification of the COT sharing as not enabled.

A fifty-second aspect, based on the forty-sixth aspect, wherein the program code executable by the computer for causing the computer to determine includes program code executable by the computer for causing the computer to receive a configuration message from the serving base station, wherein the configuration message indicates whether the COT sharing is one of enabled or not enabled.

A fifty-third aspect, based on the fifty-second aspect, further including program code executable by the computer for causing the computer to use, by the UE, an energy detection (ED) threshold configuration for the LBT procedure not configured for sharing in response to identification of the COT sharing as not enabled.

A fifty-fourth aspect, based on the forty-sixth aspect, wherein the COT sharing information includes an index to a table shared by the UE and the serving base station, wherein the table includes a plurality of entries each identifying one or more of the remaining COT duration, the offset indication indicated as a remaining transmission time, and the CAPC corresponding.

A fifty-fifth aspect, based on the fifty-fourth aspect, wherein the table compresses the remaining COT duration and the remaining transmission time using a resource indicator value (MV).

A fifty-sixth aspect, based on the fifty-fifth aspect, wherein MV indicates one or more of the remaining transmissions time as a PUSCH slot boundary where the UE uplink transmission will end; and the remaining COT duration has a granularity of starting locations of the UE uplink transmission as configured by the serving base station.

A fifty-seventh aspect, based on the fifty-fourth aspect, wherein the table jointly codes the remaining COT duration and the offset indication using a start and length indicator value (SLIV).

A fifty-eighth aspect, based on the fifty-seventh aspect, wherein a length value of the SLIV is indicated in a granularity of PUSCH transmission start points, wherein PUSCH start points are configured by the serving base station.

A fifty-ninth aspect, based on the fifty-seventh aspect, wherein a start value of the SLIV is indicated in a granularity of one of: slots or PUSCH transmission end points and the length value of the SLIV is indicated in a granularity of one of: slots or PUSCH transmission start points.

A sixtieth aspect, based on the fifty-seventh aspect, further including program code executable by the computer for causing the computer to add, by the UE, corrective information to the uplink control message, wherein the corrective information modifies one or more values in the table indicated by the SLIV.

A sixty-first aspect, based on the forty-sixth aspect, further including program code executable by the computer for causing the computer to compress the remaining COT duration within the uplink control message, wherein the program code executable by the computer for causing the computer to compress the remaining COT duration includes program code executable by the computer for causing the computer to indicate, by the UE, a number of COT slots remaining and an ending symbol in a last slot of the number of remaining COT slots; and program code executable by the computer for causing the computer to compress the offset indication within the uplink control message, wherein the program code executable by the computer for causing the computer to compress the offset indication includes one of program code executable by the computer for causing the computer to indicate, by the UE, an ending slot number and a last symbol of the UE uplink transmission in the ending slot number; or program code executable by the computer for causing the computer to indicate, by the UE, a number of remaining transmission slots.

A sixty-second aspect, based on the forty-sixth aspect, further including program code executable by the computer for causing the computer to obtain, by the UE, a reporting location, wherein the reporting location identifies a number of slots before the end of the UE uplink transmission during which the program code executable by the computer for causing the computer to transmit the uplink control message with the COT sharing information to the serving base station is executed by the UE, wherein the remaining COT duration and the offset indication are calculated by the UE from the number of slots before the end of the UE uplink transmission.

A sixty-third aspect, based on the forty-sixth aspect, further including program code executable by the computer for causing the computer to determine, by the UE, a time gap between the end of the UE uplink transmission and a subsequent downlink transmission start occasion; program code executable by the computer for causing the computer to end, by the UE, the UE uplink transmission at the end of the UE uplink transmission in response to the time gap exceeding a minimum time for the serving base station to perform an abbreviated downlink LBT according to the LBT capability; and program code executable by the computer for causing the computer to end, by the UE, the UE uplink transmission at an ending period before the end of the UE uplink transmission in response to the minimum time exceeding the time gap, wherein an extended time gap between the ending period before the end of the UE uplink transmission is sufficient to accommodate the minimum time for the serving base station to perform the abbreviated LBT.

A sixty-fourth aspect, based on the sixty-third aspect, further including program code executable by the computer for causing the computer to determine, by the UE, a transport block size for the UE uplink transmission based on one of: the end of the UE uplink transmission with rate matching based on the ending period before the end of the UE uplink transmission; the end of the UE uplink transmission with the rate matching based on the end of the UE uplink transmission, wherein the UE punctures resources associated with the extended time gap; or the ending period before the end of the UE uplink transmission with the rate matching based on the ending period before the end of the UE uplink transmission.

A sixty-fifth aspect, based on the sixty-fourth aspect, wherein the program code executable by the computer for causing the computer to transmit the uplink control message includes program code executable by the computer for causing the computer to multiplex the uplink control message according to one of a first number of multiplex symbols fewer than an actual number of multiplex symbols based on the end of the UE uplink transmission used; the actual number of multiplex symbols based on the end of the UE uplink transmission used; or a second number of multiplex symbols greater than the actual number of multiplex symbols based on the end of the UE uplink transmission used.

A sixty-sixth aspect, based on the forty-fifth aspect, further including program code executable by the computer for causing the computer to obtain, by the UE, a set of transmission configurations from the serving base station; program code executable by the computer for causing the computer to select, by the UE, a transmission configuration from the set of transmission configurations; and program code executable by the computer for causing the computer to add, by the UE, a configuration indicator to the uplink control message, wherein the configuration indicator identifies the transmission configuration to the serving base station.

A sixty-seventh aspect configured for wireless communication may comprise at least one processor; and a memory coupled to the at least one processor, wherein the at least one processor may be configured to acquire, by a UE, a COT in response to success detected of a LBT procedure of the UE on a shared communication channel; to determine, by the UE, whether COT sharing is one of enabled or not enabled; to identify, by the UE, COT sharing information for communication to a serving base station within an uplink control message, wherein the COT sharing information is identified in response to execution of the configuration of the at least one processor to determine; and to transmit, by the UE, the uplink control message with the COT sharing information to the serving base station.

A sixty-eighth aspect, based on the sixty-seventh aspect, wherein the COT sharing information includes one or more of a remaining COT duration from an end of one of a UE uplink transmission during the COT or a PUSCH transmission containing the COT sharing information to an endpoint of the COT; an offset indication identifying the end of the UE uplink transmission; and a CAPC used by the UE for acquisition of the COT.

A sixty-ninth aspect, based on the sixty-eighth aspect, wherein the configuration of the at least one processor to determine includes configuration of the at least one processor to identify an ED threshold configuration of the UE; to determine that the COT sharing is enabled in response to identification of the ED threshold configuration as configured for sharing; and to determine that the COT sharing is not enabled in response to identification of the ED threshold configuration as not configured for sharing.

A seventieth aspect, based on the sixty-ninth aspect, wherein the configuration of the at least one processor to identify the COT sharing information includes configuration of the at least one processor to one of identify the remaining COT duration, the offset indication, and the CAPC for the uplink control message when the COT sharing is determined to be enabled; or identify for the uplink control message when the COT sharing is determined to be not enabled, the offset indication and one or more of removal of the CAPC; the remaining COT duration; a 1-bit flag indicating whether the serving base station is allowed to transmit during a remainder of the COT; or an indication of a number of symbols available for transmission by the serving base station.

A seventy-first aspect, based on the sixty-eighth aspect, wherein the configuration of the at least one processor to determine includes configuration of the at least one processor to receive a configuration message from the serving base station, wherein the configuration message includes identification of the COT sharing information to include in the uplink control message; and to determine whether the COT sharing is one of enabled or not enabled based on the identification of the COT sharing information in the configuration message.

A seventy-second aspect, based on the seventy-first aspect, wherein the configuration of the at least one processor to determine whether the COT sharing is one of enabled or not enabled includes configuration of the at least one processor to identify the configuration message indicates exclusion of the CAPC and the remaining COT duration from the uplink control message, wherein the UE determines the COT sharing is not enabled in response to execution of the configuration of the at least one processor to identify the configuration message.

A seventy-third aspect, based on the seventy-second aspect, further including configuration of the at least one processor to use, by the UE, an energy detection (ED) threshold configuration for the LBT procedure not configured for sharing in response to identification of the COT sharing as not enabled.

A seventy-fourth aspect, based on the sixty-eighth aspect, wherein the configuration of the at least one processor to determine includes configuration of the at least one processor to receive a configuration message from the serving base station, wherein the configuration message indicates whether the COT sharing is one of enabled or not enabled.

A seventy-fifth aspect, based on the seventy-fourth aspect, further including configuration of the at least one processor to use, by the UE, an energy detection (ED) threshold configuration for the LBT procedure not configured for sharing in response to identification of the COT sharing as not enabled.

A seventy-sixth aspect, based on the sixty-eighth aspect, wherein the COT sharing information includes an index to a table shared by the UE and the serving base station, wherein the table includes a plurality of entries each identifying one or more of the remaining COT duration, the offset indication indicated as a remaining transmission time, and the CAPC corresponding.

A seventy-seventh aspect, based on the seventy-sixth aspect, wherein the table compresses the remaining COT duration and the remaining transmission time using a resource indicator value (MV).

A seventy-eighth aspect, based on the seventy-seventh aspect, wherein MV indicates one or more of the remaining transmissions time as a PUSCH slot boundary where the UE uplink transmission will end; and the remaining COT duration has a granularity of starting locations of the UE uplink transmission as configured by the serving base station.

A seventy-ninth aspect, based on the seventy-sixth aspect, wherein the table jointly codes the remaining COT duration and the offset indication using a start and length indicator value (SLIV).

An eightieth aspect, based on the seventy-ninth aspect, wherein a length value of the SLIV is indicated in a granularity of PUSCH transmission start points, wherein PUSCH start points are configured by the serving base station.

An eighty-first aspect, based on the seventy-ninth aspect, wherein a start value of the SLIV is indicated in a granularity of one of: slots or PUSCH transmission end points and the length value of the SLIV is indicated in a granularity of one of: slots or PUSCH transmission start points.

An eighty-second aspect, based on the seventy-ninth aspect, further including configuration of the at least one processor to add, by the UE, corrective information to the uplink control message, wherein the corrective information modifies one or more values in the table indicated by the SLIV.

An eighty-third aspect, based on the sixty-eighth aspect, further including configuration of the at least one processor to compress the remaining COT duration within the uplink control message, wherein configuration of the at least one processor to compress the remaining COT duration includes configuration of the at least one processor to indicate, by the UE, a number of COT slots remaining and an ending symbol in a last slot of the number of remaining COT slots; and to compress the offset indication within the uplink control message, wherein the configuration of the at least one processor to compress the offset indication includes configuration of the at least one processor to one of indicate, by the UE, an ending slot number and a last symbol of the UE uplink transmission in the ending slot number; or indicate, by the UE, a number of remaining transmission slots.

An eighty-fourth aspect, based on the sixty-eighth aspect, further including configuration of the at least one processor to obtain, by the UE, a reporting location, wherein the reporting location identifies a number of slots before the end of the UE uplink transmission during which the configuration of the at least one processor to transmit the uplink control message with the COT sharing information to the serving base station is executed by the UE, wherein the remaining COT duration and the offset indication are calculated by the UE from the number of slots before the end of the UE uplink transmission.

An eighty-fifth aspect, based on the sixty-eighth aspect, further including configuration of the at least one processor to determine, by the UE, a time gap between the end of the UE uplink transmission and a subsequent downlink transmission start occasion; to end, by the UE, the UE uplink transmission at the end of the UE uplink transmission in response to the time gap exceeding a minimum time for the serving base station to perform an abbreviated downlink LBT according to the LBT capability; and to end, by the UE, the UE uplink transmission at an ending period before the end of the UE uplink transmission in response to the minimum time exceeding the time gap, wherein an extended time gap between the ending period before the end of the UE uplink transmission is sufficient to accommodate the minimum time for the serving base station to perform the abbreviated LBT.

An eighty-sixth aspect, based on the eighty-fifth aspect, further including configuration of the at least one processor to determine, by the UE, a transport block size for the UE uplink transmission based on one of the end of the UE uplink transmission with rate matching based on the ending period before the end of the UE uplink transmission; the end of the UE uplink transmission with the rate matching based on the end of the UE uplink transmission, wherein the UE punctures resources associated with the extended time gap; or the ending period before the end of the UE uplink transmission with the rate matching based on the ending period before the end of the UE uplink transmission.

An eighty-seventh aspect, based on the eighty-sixth aspect, wherein the configuration of the at least one processor to transmit the uplink control message includes configuration of the at least one processor to multiplex the uplink control message according to one of a first number of multiplex symbols fewer than an actual number of multiplex symbols based on the end of the UE uplink transmission used; the actual number of multiplex symbols based on the end of the UE uplink transmission used; or a second number of multiplex symbols greater than the actual number of multiplex symbols based on the end of the UE uplink transmission used.

An eighty-eighth aspect, based on the sixty-seventy aspect, further including configuration of the at least one processor to obtain, by the UE, a set of transmission configurations from the serving base station; to select, by the UE, a transmission configuration from the set of transmission configurations; and to add, by the UE, a configuration indicator to the uplink control message, wherein the configuration indicator identifies the transmission configuration to the serving base station.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving a configuration message from a serving base station, the configuration message including identification of COT sharing information to include in an uplink control message;
   acquiring, by a user equipment (UE), a channel occupancy time (COT) in response to success detected of a listen before talk (LBT) procedure of the UE on a shared communication channel;
   determining, by the UE, whether COT sharing is one of enabled or not enabled based on the identification of the COT sharing information in the configuration message;
   identifying, by the UE, the COT sharing information for communication to the serving base station within the uplink control message, in response to determination that the COT sharing is enabled, the COT sharing information including each of:
   a remaining COT duration from an end of one of a UE uplink transmission during the COT or a physical uplink shared channel (PUSCH) transmission containing the COT sharing information to an endpoint of the COT; and
   an offset indication identifying the end of the UE uplink transmission; and
   a channel access priority class (CAPC) used by the UE for acquisition of the COT; and
   transmitting, by the UE, the uplink control message with the COT sharing information to the serving base station.

2. The method of claim 1, wherein the determining whether the COT sharing is one of enabled or not enabled includes:
   identifying the configuration message indicates exclusion of the CAPC and the remaining COT duration from the uplink control message, wherein the UE determines the COT sharing is not enabled in response to the identifying the configuration message.

3. The method of claim 2, further including:
using, by the UE, an energy detection (ED) threshold configuration for the LBT procedure not configured for sharing in response to identification of the COT sharing as not enabled.

4. The method of claim 1, wherein the COT sharing information includes an index to a table shared by the UE and the serving base station, wherein the table includes a plurality of entries each identifying one or more of the remaining COT duration, the offset indication indicated as a remaining transmission time, and the CAPC corresponding.

5. The method of claim 4, wherein the table compresses the remaining COT duration and the remaining transmission time using a resource indicator value (RIV).

6. The method of claim 5, wherein RIV indicates one or more of:
the remaining transmissions time as a physical uplink shared channel (PUSCH) slot boundary where the UE uplink transmission will end; and
the remaining COT duration has a granularity of starting locations of the UE uplink transmission as configured by the serving base station.

7. The method of claim 4, wherein the table jointly codes the remaining COT duration and the offset indication using a start and length indicator value (SLIV).

8. The method of claim 7, wherein a length value of the SLIV is indicated in a granularity of physical uplink shared channel (PUSCH) transmission start points, wherein PUSCH start points are configured by the serving base station.

9. The method of claim 7, wherein a start value of the SLIV is indicated in a granularity of one of: slots or PUSCH transmission end points and the length value of the SLIV is indicated in a granularity of one of: slots or PUSCH transmission start points.

10. The method of claim 7, further including:
adding, by the UE, corrective information to the uplink control message, wherein the corrective information modifies one or more values in the table indicated by the SLIV.

11. The method of claim 1, further including:
compressing the remaining COT duration within the uplink control message, wherein the compressing the remaining COT duration includes indicating, by the UE, a number of COT slots remaining and an ending symbol in a last slot of the number of remaining COT slots; and
compressing the offset indication within the uplink control message, wherein the compressing the offset indication includes one of:
indicating, by the UE, an ending slot number and a last symbol of the UE uplink transmission in the ending slot number; or
indicating, by the UE, a number of remaining transmission slots.

12. The method of claim 1, further including:
obtaining, by the UE, a reporting location, wherein the reporting location identifies a number of slots before the end of the UE uplink transmission during which the transmitting the uplink control message with the COT sharing information to the serving base station is performed by the UE, wherein the remaining COT duration and the offset indication are calculated by the UE from the number of slots before the end of the UE uplink transmission.

13. The method of claim 1, further including:
determining, by the UE, a time gap between the end of the UE uplink transmission and a subsequent downlink transmission start occasion;
ending, by the UE, the UE uplink transmission at the end of the UE uplink transmission in response to the time gap exceeding a minimum time for the serving base station to perform an abbreviated downlink LBT according to the LBT capability; and
ending, by the UE, the UE uplink transmission at an ending period before the end of the UE uplink transmission in response to the minimum time exceeding the time gap, wherein an extended time gap between the ending period before the end of the UE uplink transmission is sufficient to accommodate the minimum time for the serving base station to perform the abbreviated LBT.

14. The method of claim 13, further including:
determining, by the UE, a transport block size for the UE uplink transmission based on one of:
the end of the UE uplink transmission with rate matching based on the ending period before the end of the UE uplink transmission;
the end of the UE uplink transmission with the rate matching based on the end of the UE uplink transmission, wherein the UE punctures resources associated with the extended time gap; or
the ending period before the end of the UE uplink transmission with the rate matching based on the ending period before the end of the UE uplink transmission.

15. The method of claim 14, wherein the transmitting the uplink control message includes:
multiplexing the uplink control message according to one of:
a first number of multiplex symbols fewer than an actual number of multiplex symbols based on the end of the UE uplink transmission used;
the actual number of multiplex symbols based on the end of the UE uplink transmission used; or
a second number of multiplex symbols greater than the actual number of multiplex symbols based on the end of the UE uplink transmission used.

16. The method of claim 1, further including:
obtaining, by the UE, a set of transmission configurations from the serving base station;
selecting, by the UE, a transmission configuration from the set of transmission configurations; and
adding, by the UE, a configuration indicator to the uplink control message, wherein the configuration indicator identifies the transmission configuration to the serving base station.

17. An apparatus configured for wireless communication, the apparatus comprising:
at least one processor; and
a memory coupled to the at least one processor,
wherein the at least one processor is configured:
to receive a configuration message from the serving base station, wherein the configuration message includes identification of the COT sharing information to include in the uplink control message;
to acquire, by a user equipment (UE), a channel occupancy time (COT) in response to success detected of a listen before talk (LBT) procedure of the UE on a shared communication channel;

to determine, by the UE, whether COT sharing is one of enabled or not enabled based on the identification of the COT sharing information in the configuration message;

to identify, by the UE, the COT sharing information for communication to the serving base station within the uplink control message, in response to determination that the COT sharing is enabled, the COT sharing information including each of:

a remaining COT duration from an end of one of a UE uplink transmission during the COT or a physical uplink shared channel (PUSCH) transmission containing the COT sharing information to an endpoint of the COT; and an offset indication identifying the end of the UE uplink transmission; and a channel access priority class (CAPC) used by the UE for acquisition of the COT; and to transmit, by the UE, the uplink control message with the COT sharing information to the serving base station.

18. The apparatus of claim 17, wherein the configuration of the at least one processor to determine whether the COT sharing is one of enabled or not enabled includes:
configuration of the at least one processor to identify the configuration message indicates exclusion of the CAPC and the remaining COT duration from the uplink control message, wherein the UE determines the COT sharing is not enabled in response to execution of the configuration of the at least one processor to identify the configuration message.

19. The apparatus of claim 18, further including configuration of the at least one processor to use, by the UE, an energy detection (ED) threshold configuration for the LBT procedure not configured for sharing in response to identification of the COT sharing as not enabled.

20. The apparatus of claim 17, wherein the COT sharing information includes an index to a table shared by the UE and the serving base station, wherein the table includes a plurality of entries each identifying one or more of the remaining COT duration, the offset indication indicated as a remaining transmission time, and the CAPC corresponding.

21. The apparatus of claim 20, wherein the table compresses the remaining COT duration and the remaining transmission time using a resource indicator value (RIV).

22. The apparatus of claim 21, wherein RIV indicates one or more of:
the remaining transmissions time as a physical uplink shared channel (PUSCH) slot boundary where the UE uplink transmission will end; and
the remaining COT duration has a granularity of starting locations of the UE uplink transmission as configured by the serving base station.

23. The apparatus of claim 20, wherein the table jointly codes the remaining COT duration and the offset indication using a start and length indicator value (SLIV).

24. The apparatus of claim 23, wherein a length value of the SLIV is indicated in a granularity of physical uplink shared channel (PUSCH) transmission start points, wherein PUSCH start points are configured by the serving base station.

25. The apparatus of claim 23, wherein a start value of the SLIV is indicated in a granularity of one of: slots or PUSCH transmission end points and the length value of the SLIV is indicated in a granularity of one of: slots or PUSCH transmission start points.

26. The apparatus of claim 23, further including configuration of the at least one processor to add, by the UE, corrective information to the uplink control message, wherein the corrective information modifies one or more values in the table indicated by the SLIV.

27. The apparatus of claim 17, further including configuration of the at least one processor:
to compress the remaining COT duration within the uplink control message, wherein configuration of the at least one processor to compress the remaining COT duration includes configuration of the at least one processor to indicate, by the UE, a number of COT slots remaining and an ending symbol in a last slot of the number of remaining COT slots; and
to compress the offset indication within the uplink control message, wherein the configuration of the at least one processor to compress the offset indication includes configuration of the at least one processor to one of:
indicate, by the UE, an ending slot number and a last symbol of the UE uplink transmission in the ending slot number; or
indicate, by the UE, a number of remaining transmission slots.

28. The apparatus of claim 17, further including configuration of the at least one processor:
to obtain, by the UE, a reporting location, wherein the reporting location identifies a number of slots before the end of the UE uplink transmission during which the configuration of the at least one processor to transmit the uplink control message with the COT sharing information to the serving base station is executed by the UE, wherein the remaining COT duration and the offset indication are calculated by the UE from the number of slots before the end of the UE uplink transmission.

29. The apparatus of claim 17, further including configuration of the at least one processor:
to determine, by the UE, a time gap between the end of the UE uplink transmission and a subsequent downlink transmission start occasion;
to end, by the UE, the UE uplink transmission at the end of the UE uplink transmission in response to the time gap exceeding a minimum time for the serving base station to perform an abbreviated downlink LBT according to the LBT capability; and
to end, by the UE, the UE uplink transmission at an ending period before the end of the UE uplink transmission in response to the minimum time exceeding the time gap, wherein an extended time gap between the ending period before the end of the UE uplink transmission is sufficient to accommodate the minimum time for the serving base station to perform the abbreviated LBT.

30. The apparatus of claim 29, further including configuration of the at least one processor:
to determine, by the UE, a transport block size for the UE uplink transmission based on one of:
the end of the UE uplink transmission with rate matching based on the ending period before the end of the UE uplink transmission;
the end of the UE uplink transmission with the rate matching based on the end of the UE uplink transmission, wherein the UE punctures resources associated with the extended time gap; or the ending period before the end of the UE uplink transmission with the rate matching based on the ending period before the end of the UE uplink transmission.

31. The apparatus of claim 30, wherein the configuration of the at least one processor to transmit the uplink control message includes configuration of the at least one processor:
   to multiplex the uplink control message according to one of:
      a first number of multiplex symbols fewer than an actual number of multiplex symbols based on the end of the UE uplink transmission used;
      the actual number of multiplex symbols based on the end of the UE uplink transmission used; or
      a second number of multiplex symbols greater than the actual number of multiplex symbols based on the end of the UE uplink transmission used.

32. The apparatus of claim 17, further including configuration of the at least one processor:
   to obtain, by the UE, a set of transmission configurations from the serving base station;
   to select, by the UE, a transmission configuration from the set of transmission configurations; and
   to add, by the UE, a configuration indicator to the uplink control message, wherein the configuration indicator identifies the transmission configuration to the serving base station.

* * * * *